(12) United States Patent
Murdock

(10) Patent No.: US 9,411,886 B2
(45) Date of Patent: Aug. 9, 2016

(54) RANKING ADVERTISEMENTS WITH PSEUDO-RELEVANCE FEEDBACK AND TRANSLATION MODELS

(75) Inventor: Vanessa Murdock, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 2424 days.

(21) Appl. No.: 12/059,098

(22) Filed: Mar. 31, 2008

(65) Prior Publication Data
US 2009/0248662 A1 Oct. 1, 2009

(51) Int. Cl.
*G06F 7/00* (2006.01)
*G06F 17/30* (2006.01)
*G06Q 30/02* (2012.01)

(52) U.S. Cl.
CPC .......... *G06F 17/30864* (2013.01); *G06Q 30/02* (2013.01)

(58) Field of Classification Search
CPC .................... G06F 17/30864; G06F 17/30867; G06F 17/3053
See application file for complete search history.

(56) References Cited

U.S. PATENT DOCUMENTS

2008/0109285 A1* 5/2008 Reuther ............ G06F 17/30864
705/7.11

OTHER PUBLICATIONS

Murdock "Aspects of Sentence Retrieval" University of Massachusetts Amhrest in partial fulfillment of requirements for the degree of Doctor of Philosophy Sep. 2006, Computer Science.*
Murdock et al.; Simple translation Models for Sentence Retrieval in Factoid Question Answering; Nov. 2004; Center for Intelligent Information Retrieval, Computer Science Department, University of Massachusetts, Amherst, MA.
Berger et al.; Information Retrieval as Statistical Translation; 1999; School of Computer Science, Carnegie Mellon University, Pittsburgh, PA.
Lavrenko et al.; Cross-Lingual Relevance Models; Aug. 11-15, 2002; Tampere, Finland.
Lavrenko et al.; Relevance-Based Language Models; Sep. 9-12, 2001; New Orleans, LA.
Brown et al; The Mathematics of Statistical Machine Translation: Parameter Estimation; 1993; Association for Computational Linguistics.
Murdock; Aspects of Sentence Retrieval; Sep. 2006; University of Massachusetts Amherst.
Ponte et al.; A Language Modeling Approach to Information Retrieval; 1998; 21st Annual International ACM SIGIR Conference on Research and Development in Information Retrieval, Melbourne, Australia.

* cited by examiner

*Primary Examiner* — Sherief Badawi
*Assistant Examiner* — Berhanu Mitiku
(74) *Attorney, Agent, or Firm* — Martine Penilla Group, LLP

(57) ABSTRACT

Methods, computer products, and systems for selecting advertisements in response to an internet query are provided. The method provides for receiving an internet query having query terms, and retrieving and ranking a first set of advertisements using a query likelihood model. Sampling words are selected using pseudo-relevance feedback and translation models, the internet query, and the first set of ad materials. Sampling words are chosen from the words in the first set, and the pseudo-relevance feedback model is used to select word w in the distribution of words based on a probability that w generates query term $q(p(q|w))$. The translation model calculates $p(q|w)$ based on a translation probability that w translates into $q(t(q|w))$. A second set of ad materials are retrieved and ranked using an expanded query which adds the selected sampling words to the original query. The second set of ad materials is presented to the user.

20 Claims, 5 Drawing Sheets

| QA corpus | | | | Artificial Corpus | | | |
|---|---|---|---|---|---|---|---|
| zebra | | galileo | | planet | | evolution | |
| kenya | .064 | astronomer | .099 | system | .063 | curriculum | .066 |
| libya | .024 | italy | .082 | surface | .060 | suppress | .040 |
| camp | .023 | die | .049 | earth | .047 | distort | .040 |
| safari | .023 | 1642 | .049 | jupiter | .046 | clergy | .037 |
| tanzania | .017 | 1564 | .016 | solar | .041 | mandate | .034 |
| plain | .017 | inquisition | .016 | voyage | .041 | teach | .030 |
| lion | .012 | nasa | .016 | saturn | .032 | fundamentalist | .023 |
| serengeti | .012 | jupiter | .016 | evolve | .023 | namibia | .010 |
| mara | .012 | pisa | .016 | lava | .020 | theory | .010 |

Fig. 2

RANKING ADVERTISEMENTS WITH PSEUDO-RELEVANCE FEEDBACK AND TRANSLATION MODELS

BACKGROUND

1. Field of the Invention

The present invention relates to methods and systems for selecting internet advertisements in response to an internet query, and more particularly, methods and systems for generating expanded search queries to improve the relevance of the advertisements found.

2. Description of the Related Art

Internet advertising methods retrieve ads for use in a sponsored search or content match system. Both types of advertising systems use a similar representation of the ad. That is to say, in both systems an advertisement is represented by a set of keywords, a title, a short description, and a URL, which when clicked takes the user to the advertiser's web page. Typically the user is shown the title, the description and the URL.

Sponsored search presents advertisements in the search results in response to a user's query to a search engine. Typically the ads are short and textual in nature, and appear at the top of the search results or to the side. The keywords are typically matched to the user query, and when an ad is found whose keywords match the user query, the ad is shown to the user.

In a content match system, the ads are placed in a web page based on the content of the web page itself. The system extracts a set of key terms from the web page to represent its content, and then matches the key terms from the web page to the keywords associated with the advertisement. Ads are dynamically placed in a web page as a function of the expected revenue to be generated, and the similarity between the web page and the ad keywords.

Both sponsored search and content match systems rely on sentence retrieval technology to retrieve ad candidates to be shown to the user. In sponsored search the sentence retrieval is in response to a user query. In content match the sentence retrieval is in response to a set of key terms that represent the topic of the web page, but the same retrieval technology can be applied to both systems.

The quality of sentence retrieval in response to a query term depends on numerous factors, such as the number of terms in the query, the specificity of the query, the number of potential meanings for query terms, the quality of the retrieval mechanisms, the amount of time available for retrieval, etc. Some of the applications for sentence retrieval include question answering, result abstracts related to internet URLs (Universal Resource Locator), and selection of advertising based on the provided query.

Online advertising systems operate on short textual descriptions of the ad, typically including a title, a description of one or two sentences in length, a set of keywords, and a search context. For example, the search context can be either a Web page in the case of contextual advertising, or a query in the case of a sponsored search. In this document we refer to ad materials as the set of title, description, and keywords that comprise an Internet advertisement. The term advertisement refers to the subset of these materials that is shown to a user in the search interface.

Pseudo-relevance feedback has been shown to be effective for document retrieval, but it has had mixed results when applied to the retrieval of short texts such as sentences. The term pseudo-relevance feedback is related to relevance feedback, where feedback on the relevance of the results from a first search is given to the system by a user in order to do another search that relates to the documents with the better scores. Some systems use the "more like this" button to implement relevance feedback. Pseudo-relevance feedback relates to simulating relevance feedback by the system before performing another focused search.

However, pseudo-relevance feedback is not very effective when retrieving short texts, such as advertisements. Advertisements are sensitive to expansion because the term frequency distribution is relatively flat, and even a small number of noisy expansion terms may be completely off the intended topic for the original query.

It is in this context that embodiments of the invention arise.

SUMMARY

Embodiments of the present invention provide methods, computer products, and systems for selecting advertisements in response to an internet query. One method includes using pseudo-relevance feedback and translation models to perform a second internet search with an expanded query that adds related terms to the original internet query terms.

It should be appreciated that the present invention can be implemented in numerous ways, such as a process, an apparatus, a system, a device or a method on a computer readable medium. Several inventive embodiments of the present invention are described below.

In one embodiment, a method for selecting advertisements in response to an internet query is provided. The method includes receiving an internet query with at least one query term, retrieving and then ranking a first set of ad materials in response to the internet query using a query likelihood model. The method continues by generating a distribution of words from the first set of ad materials and then selecting sampling words from the distribution using pseudo-relevance feedback and translation models, the internet query, and the first set of ad materials obtained using the query likelihood model. The sampling words are chosen from a distribution of words from the words in the first set of ad materials, and the pseudo-relevance feedback model is used to select words (w) in the distribution of words based on a probability that word w generates query term $q(p(q|w))$. The translation model is used to calculate a translation probability that w translates into q $(t(q|w))$, and then $t(q|w)$ is utilized to evaluate the probability $p(q|w)$. The method then retrieves and ranks a second set of ad materials using an expanded query formed by adding the selected distribution words to the original internet query. Advertisements based on the second set of ad materials are then presented to the user. The use of translation models enhances the topicality of the results because the distribution words selected are related to the terms in the original query as indicated by their translation probabilities.

In another embodiment, a system for selecting advertisements in response to an internet query is provided. The system includes a search server, an ad server, a translation server and a display. The search server receives internet queries and the ad server generates ad materials. Given an internet query, the ad server retrieves and ranks a first set of ad materials in response to the internet query using a query likelihood model. The translation server receives the first set of ad materials and selects a plurality of distribution words using pseudo-relevance feedback and translation models, the internet query, and the first set of ad materials. Once the translation server creates the distribution words, the ad server retrieves and ranks a second set of ad materials using an expanded query that includes the original internet query plus the selected distribution words. The display is used to present advertisements based on the second set of ad materials to the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 2 shows samples of translation tables used in one embodiment of the invention.

DETAILED DESCRIPTION

The following embodiments describe methods, computer products, and systems for selecting advertisements in response to an internet query. The method uses pseudo-relevance feedback and translation models to expand the original query with related terms to retrieve ad materials. The use of translation models enhances the topicality of the results because the distribution words selected are related to the terms in the original query as indicated by their translation probabilities.

It will be obvious, however, to one skilled in the art, that the present invention may be practiced without some or all of these specific details. In other instances, well known process operations have not been described in detail in order not to unnecessarily obscure the present invention.

Sentence Retrieval is the task of retrieving a relevant sentence in response to a query, a question, or a reference sentence. Sentence retrieval is used in the areas of question answering, getting an abstract or snippet for a document, selecting advertisement based on the content of the found sentences, selecting an advertisement such a sponsored search based on the query, novelty detection, etc. The techniques used for sentence retrieval are usually the same techniques used for document retrieval. However, document retrieval differs from sentence retrieval and some of the approaches used for document retrieval do not perform well for sentence retrieval. The term sentence used herein for the description of the invention should be interpreted as a general term that can refer to any part of ad materials, such as a description, a title, or a set of key terms, or to any combination of the parts in ad materials.

Figure 1:
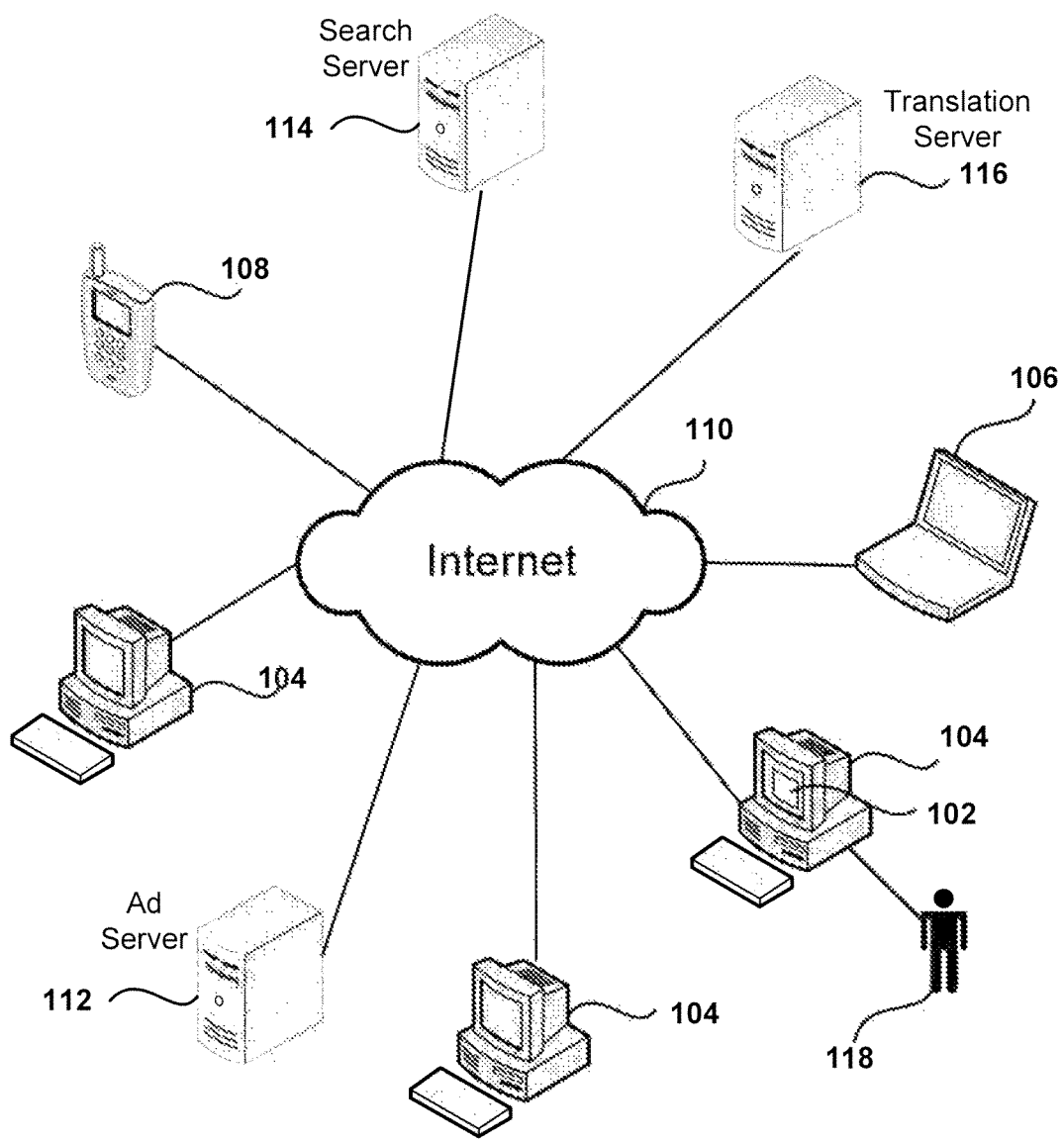
FIG. 1 describes a simplified schematic diagram of a network system for implementing embodiments of the present invention.

FIG. 1 describes a simplified schematic diagram of a network system for implementing embodiments of the present invention. Internet 110 is used to interconnect users with servers. Users 118 access the Internet 110 via a variety of the devices, such as PCs 104, laptops 106, mobile phones 108, etc. These are merely examples, and any other device used to access Internet 110 can be used to implement embodiments of this invention. For example, the devices may be wired or wireless. In one embodiment, a browser 102 is executed on a device, and the graphical user interface is presented on a display. The browser 102, provides the functionality for accessing the Internet.

In accordance with one embodiment, search server 114 provides search services to Internet users. Typically, search server 114 retrieves information related to a query provided by a user. The information provided can include references to related documents, including a title, an abstract or snippet summarizing content, a URL, size and format of the document, pointers to similar documents or cached versions, translations, etc. In addition, search server 114 can provide answers to questions, related queries suggestions, additional services offered to internet users, etc. Ad server 112 generates ad materials based on the internet query, such as advertisement based on the found documents or the query, and sponsored searches.

Translation server 116 provides translation services. In one embodiment, translation server 116 receives information about a set of internet documents from search server 114 and creates a distribution of terms from the documents. Translation server then uses translation models to select a set of terms from the distribution of terms based on the translation probabilities of the terms in the query that generated the set of internet documents.

Although three different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Query likelihood for document retrieval ranks documents by the probability that the query was generated by the same distribution of terms the document is from. When query likelihood is used to retrieve sentences, the term "document" is replaced by the term sentence, and the sentence is part of a document.

$$P(s \mid Q) \propto P(s) \prod_{q \in Q}^{Q} P(q \mid s) \quad (1)$$

Where Q is the query, |Q| is the number of terms in the query, $q_i$, is the $i^{th}$ term in the query, and s is a document (or sentence). Words that appear in the query and do not appear in the document have a probability of zero, which results in a zero probability of the query having been generated by the document. To resolve this problem, smoothing is used to give a non-zero probability to unseen words.

In the query likelihood approach, the words in a document are assumed to have a multinomial distribution. Documents are ranked according to the probability that the query was generated by random sampling from the document. Documents are sufficiently long to be distinguishable in terms of their word probability distributions. Sentences, which have considerably fewer words than documents, may be too short to accurately estimate the probability distributions of the words, or to compare those distributions to each other.

Relevance feedback collects terms from known relevant documents or clusters of related terms, and uses these terms in place of the original query. Pseudo-relevance feedback also replaces the query with terms from documents, but whereas in relevance feedback the documents or term clusters have been judged relevant by a person (for instance, the user), in pseudo-relevance feedback the documents are automatically retrieved and assumed—but not guaranteed—to be relevant.

Relevance models perform an initial query likelihood retrieval, using the original query. A model is constructed from the top N retrieved documents, and m content terms are sampled from the distribution of terms in the model. This set of sampled terms serves as a distribution of query terms, and the documents are re-ranked according to the likelihood they generated the new distribution of query terms. In another embodiment, the m terms are added to the query terms before re-ranking the documents. N and m are parameters to be tuned.

A relevant document will contain many of the terms in the expanded query, because the expansion terms co-occurred frequently in the top N documents. Terms in the expanded query that are not in the document will get the background probability, but for a relevant document the scores for the matching terms will dominate the scores from the non-matching terms. If the query is expanded with a few spurious terms from a different topic, there may be documents that are retrieved because of these terms, but their scores will be lower than the scores of the relevant documents because there will be fewer spurious matching terms.

A relevant sentence, by contrast, will match a few terms from the expanded query, and is unlikely to contain multiples of the same term. If the query is expanded with a few spurious terms unrelated to the topic of the query, a non-relevant sentence that matches the spurious terms will match as many terms in the query as a relevant sentence. Furthermore, since the sentence has so few terms to begin with, most of the terms in the expanded query will receive the background score, causing the scores of relevant and non-relevant sentences to be similar. Still yet, relevance models are designed to capture a model of the topic of the document. By their nature relevance models capture the notion of relevance required by document retrieval: the notion of topicality. For many sentence retrieval tasks, topicality is not sufficient for relevance. For this reason, in addition to the reasons outlined above, relevance models are not ideal for sentence retrieval.

Pseudo-relevance models produce a query expansion for ad hoc document retrieval by creating a distribution of terms from the set of relevant documents for a given query. A pseudo-relevance model estimates the set of relevant documents by doing an initial retrieval, and then creating a unigram language model of the terms in the retrieved documents. The model then creates a new query by sampling from the distribution, according to:

$$P(w|Q) = kP(w)P(Q|w) \quad (2)$$

Where Q is a query, w is a term in the vocabulary, k is a constant, and P(Q|w) is estimated as the product over each term in the query of probability of the query term q given a term w in the vocabulary:

$$P(Q|w) = \prod_{q \in Q} P(q|w) \quad (3)$$

The probability of a word in the query, given a word from the vocabulary, is estimated over the working set of "relevant" documents D from the initial retrieval pass:

$$P(q|w) = \sum_{d \in D} \frac{P(q|d)P(w|d)P(d)}{P(w)} \quad (4)$$

Where the probability of a query term (or word from the vocabulary) given a document, is the frequency of the term in the document divided by the total number of terms in the document:

$$P(w|d) = \frac{\#(w; d)}{|d|} \quad (5)$$

P(w) is the prior probability of a word in the vocabulary:

$$P(w) = \sum_{d \in D} P(w|d)P(d) \quad (6)$$

The number of documents from which to sample, and the number of terms to be sampled are parameters to be set empirically. In theory, a query could be expanded with the entire vocabulary of the set of "relevant" documents because the model assumes that there is some distribution of terms from which relevant documents are sampled. Thus the distribution of terms in a relevant document will be closer to the distribution of terms in the expanded query than the distribution of terms in a non-relevant document. The frequency of a term in the document is an indicator of its topic, as terms that represent the topic of the document are more likely to have a higher frequency, and off-topic terms generally have a lower frequency.

The problem for sentence retrieval arises in equation (5), where the expansion terms are weighted by their frequency in the sentence. Sentences typically have one instance of a content term. Term frequency is not a reliable indicator of topicality as each term in a sentence has approximately the frequency 1 divided by the number of terms in the sentence. Higher frequency terms in sentences are most likely stop words—frequent words that carry little content such as "of" and "the". Embodiments of the invention provide for a family of models, named Model R family, that weight expansion terms according to their probability of being related to the original query terms, rather than by their frequency in the sentence.

Machine translation has its foundations in statistical speech recognition. Translation models are trained on a parallel corpus of sentences in the source language paired with sentences in the target language. In sentence retrieval, the source (S) is the sentence to be ranked, and the observation or target (Q) is the query. Translation as a concept is not intuitive when discussing two sentences that are in the same language. Translation models for sentence retrieval treat the two sentences as if they are in completely different languages, and learn a translation table assuming the two vocabularies are distinct.

FIG. 2 shows samples of translation tables used in one embodiment of the invention. The examples in columns one and two are from a translation table learned from a parallel corpus of questions and answer sentences. The third and fourth columns are from a translation table learned from a parallel corpus artificially constructed from terms sampled according to their mutual information with the document, paired with sentences from the document.

Using translation models generalizes a variety of data, and there is no dependency on preprocessing, such as parsing or tagging. A major difference between machine translation and sentence retrieval is that machine translation assumes there is little, if any, overlap in the vocabularies of the two languages. In sentence retrieval, the overlap between the two vocabularies is considered by the retrieval algorithm. In one embodiment of the invention, the translation probabilities are taken from a translation table learned prior to ranking.

Figure 3:
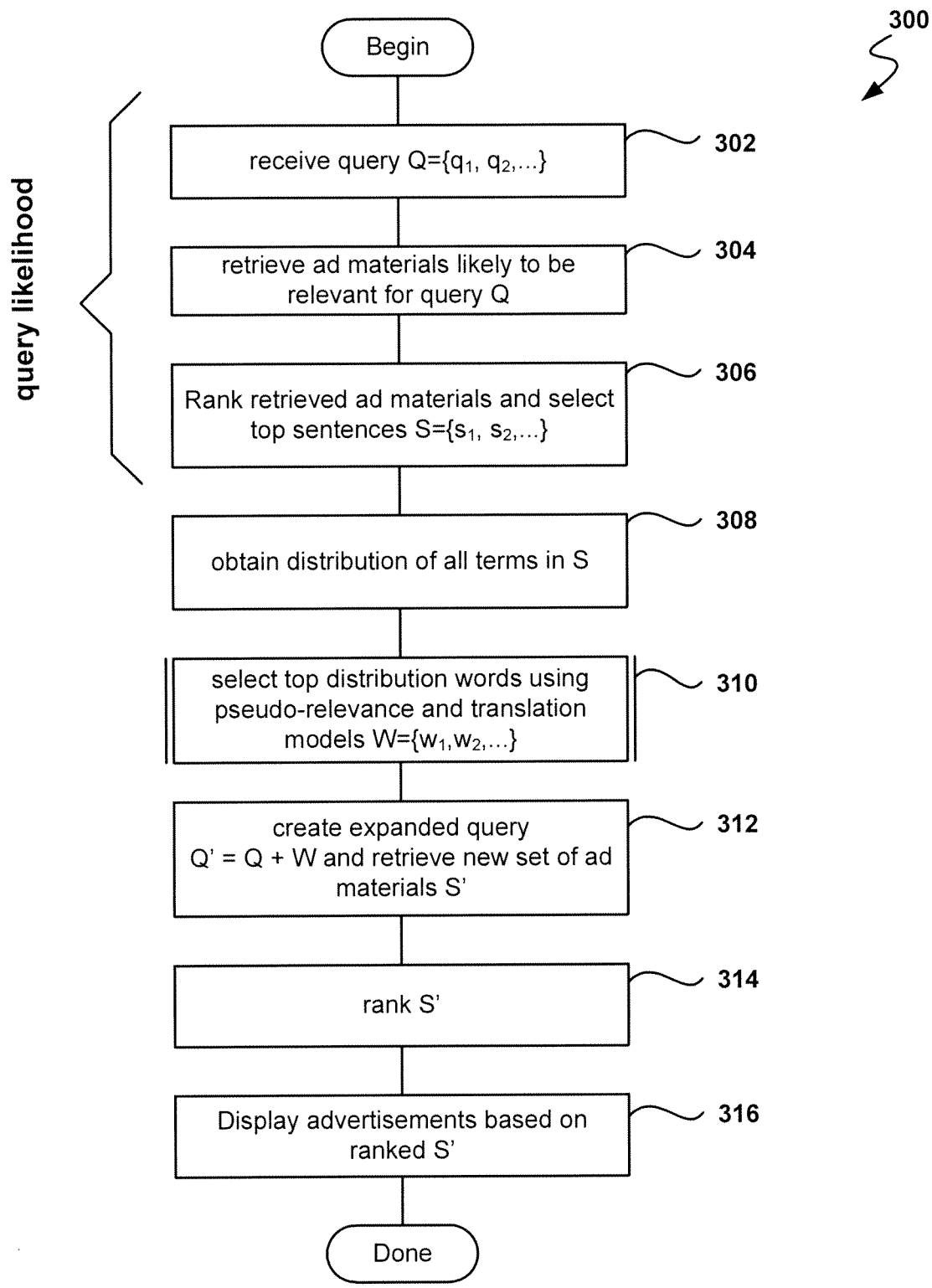
FIG. 3 shows the flow of an algorithm to rank advertisements in accordance with one embodiment of the invention.

FIG. 3 shows the flow of an algorithm to rank advertisements in accordance with one embodiment of the invention. The method begins using query likelihood 302-306 to retrieve and select ad materials related to an internet query. In operation 302 the query (Q) is received by search server 114 of FIG. 1. The query Q includes one or more query terms (q). Ad server 112 then retrieves ad materials relevant for the given query. In operation 306, the retrieved ad materials are ranked and a first set (S) of ad materials (s) is formed by selecting the top most relevant ad materials previously retrieved. Then, a distribution of the terms in the first set of ad materials is obtained in operation 308.

In operation 310, the top distribution words are selected using pseudo-relevance feedback and translation models, the query, and the first set of ad materials. Two embodiments for performing operation 310 are described below with respect to FIGS. 4 and 5, describing models R1 and R2 respectively. In operation 312 an extended query is formed by adding the selected distribution words, also known as sampling words, to the original query terms. In another embodiment, only the selected distribution words are used for the expanded query. The new set of ad materials are ranked in operation 314, and then advertisements based on the new set of ad materials are displayed in operation 316. The advertisements are based on the ad materials found and the advertisements displayed may include any combination of title, description and keywords from the ad materials, where the title, description and keywords may be shown in full or in part. In one embodiment, the results are presented in an internet browser window.

R1 is the first model in the model R family. In model R1, the distribution terms are weighed according to translation probabilities. In previous pseudo-relevance models the sentences are sampled from a working set of higher quality terms, with a wider vocabulary, but previous models have a problem because terms are sampled according to a flat frequency distribution. In equations (3) and (4) the probability of a term in the query given a word from the vocabulary is estimated as the query term given the document weighted by the frequency of the vocabulary term in the document. In model R1, a translation table is used to estimate the probability of a query term given a term from the vocabulary directly. Model R1 then includes the following formulas:

$$P(w|Q) = kP(w)P(Q|w) \tag{7}$$

$$P(Q|w) = \prod_{q \in Q} P(q|w) \tag{8}$$

$$P(q|w) = t(q|w) \tag{9}$$

$$P(w) = \sum_{s \in S} P(w|s)P(s) \tag{10}$$

Where t(q|w) is estimated using a translation model, thus replacing the unigram term frequency distribution in formula (3). In this model, only related terms that appear in the translation table will have a non-zero probability, and only terms that appear in the working set of sentences that also are associated with the query terms via the translation table are considered for expansion. Furthermore, the expansion terms are weighted by their translation probability with query terms.

Figure 4:
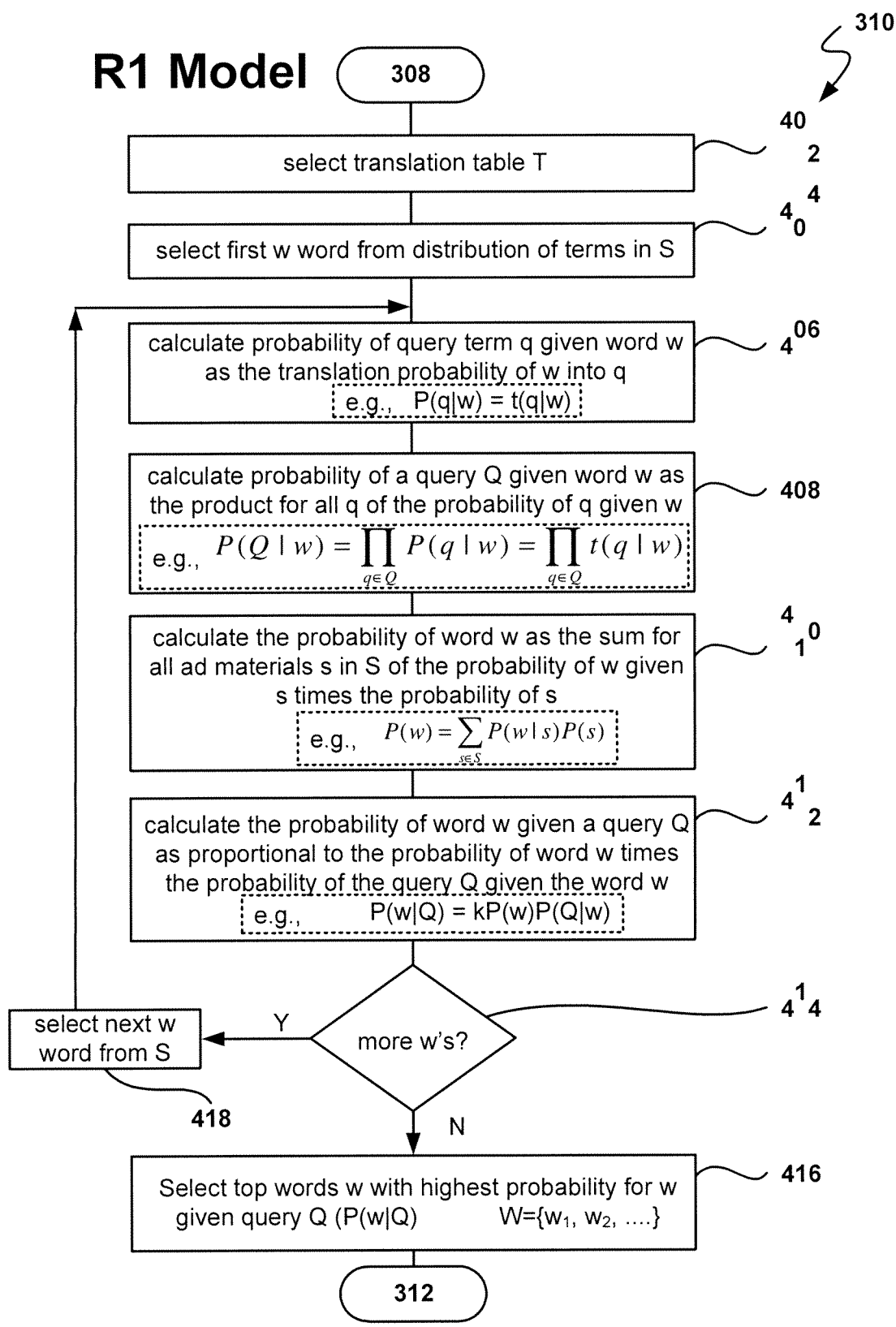
FIG. 4 describes the details of the flow to select distribution words using pseudo-relevance feedback and translation models according to one embodiment using model R1.

FIG. 4 describes the details of the flow to select distribution words using pseudo-relevance feedback and translation models according to one embodiment using model R1. In operation 402, a translation table is selected. A plurality of translation tables can be available, such as for example the ones described with respect to FIG. 2. In operation 404, a first word w is selected from the distribution of terms in S to start the process of selecting the best distribution words for the extended query.

In operation 406, formula (9) is evaluated, that is the probability that word w generates q(p(q|w)) is equal to the translation probability that w translates into q(t(q|w)). Formula (8) is evaluated in operation 408, that is the probability of a query Q given word w is calculated as the product for all q of the probability p(q|w). Operation 410 evaluates formula (10) by calculating the probability of word w(p(w)) as the sum for all ad materials s in S of the probability of w given s(p(w|s)) times the probability of the ad materials s(p(s)).

Formula (7) used to select the extended query is evaluated in operation 412 by calculating the probability of word w given a query Q(p(w|Q)) as proportional to the probability p(w) times the probability p(Q|w). In operation 414, the method checks whether there are more distribution words to appraise. If there are more words, operation 418 selects a new distribution word and operations 406-412 are performed for the new word. If there are no more words in operation 414, the method proceeds to operation 416, where a group of top words are selected from the distribution words according to their appraised p(w|Q). The method then continues to operation 312 as seen in FIG. 3.

R1 is the second model in the model R family. In model R2, the unigram distribution is weighed by the translation probability. One issue with using translation tables is that the probabilities are learned from a parallel corpus. As a parallel corpus is somewhat noisy, the translation probabilities might be somewhat unreliable. Instead of using the translation probabilities directly, translation probabilities are used to weight the estimate of P(q|w). Model R2 includes the following formulas:

$$P(w|Q) = kP(w)P(Q|w) \tag{11}$$

$$P(Q|w) = \prod_{q \in Q} P(q|w) \tag{12}$$

$$P(q|w) = \sum_{s \in S} \frac{t(q|w)P(q|s)P(w|s)P(s)}{P(w)} \tag{13}$$

$$P(w) = \sum_{d \in D} P(w|s)P(s) \tag{14}$$

$$P(q|s) = \frac{\#(w; s)}{|s|} \tag{15}$$

Where t(q|w) is estimated using a translation model. In this embodiment, the unigram term frequency is weighted by the translation probability with the query term. The effect is to discount high frequency terms that are not related to the query terms, and to increase the variance in the contribution of content terms.

Figure 5:
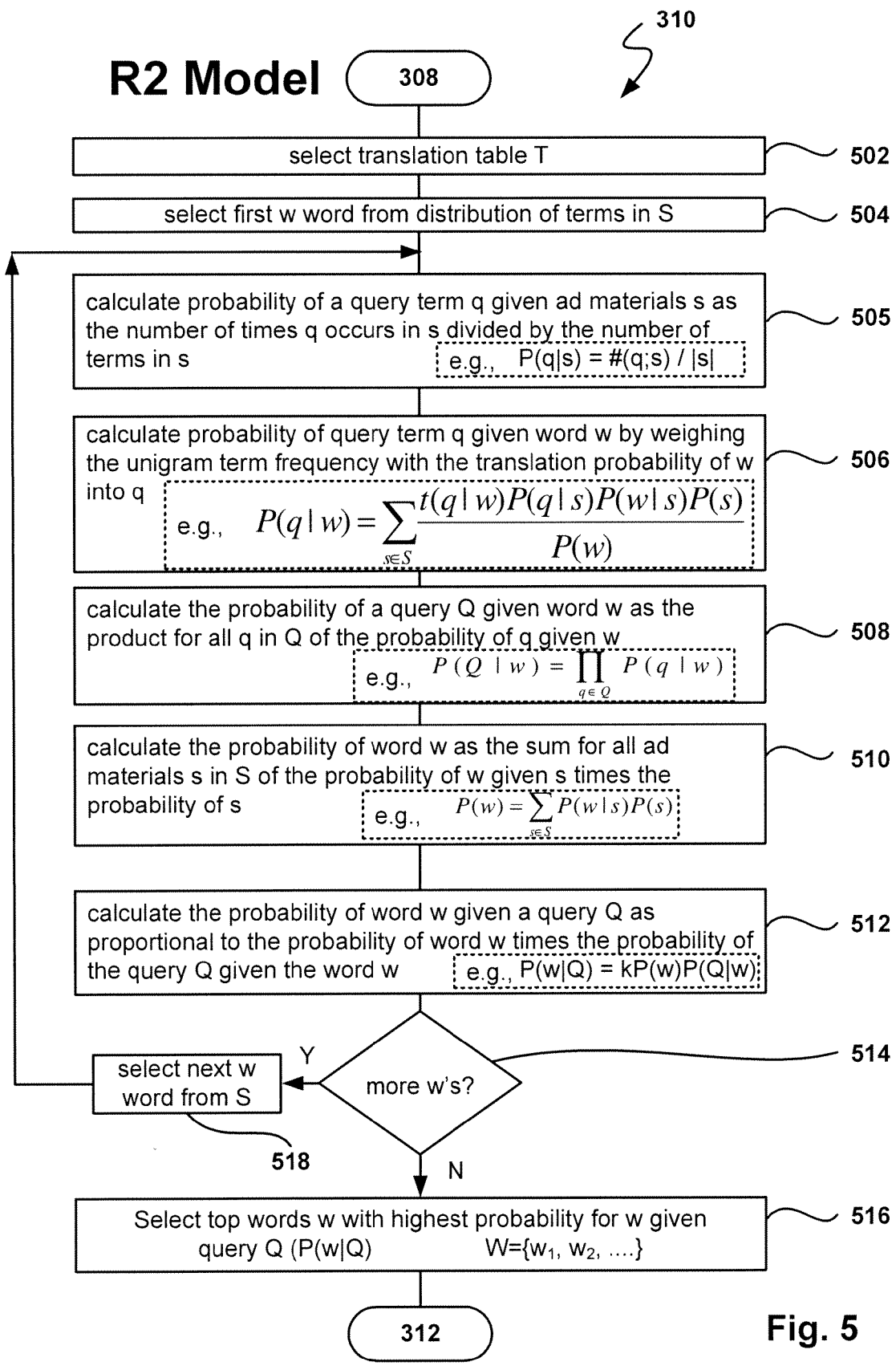
FIG. 5 describes the details of the flow to select distribution words using pseudo-relevance feedback and translation models according to one embodiment using model R2.

FIG. 5 describes the details of the flow to select distribution words using pseudo-relevance feedback and translation models according to one embodiment using model R2. In operation 502, a translation table is selected. In operation 504, a first word w is selected from the distribution of terms in S to start the process of selecting the best distribution words for the extended query. In operation 505, formula (15) is evaluated by calculating the probability that a query term q given ad materials s as the number of times q occurs in s divided by the number of terms in ad materials s. In operation 506, formula (13) is evaluated, that is, the probability that word w generates q(p(q|w)) is equal to the sum for all ad materials s in S of the translation probability that w translates into q(t(q|w)) times p(q|s) times p(w|s) times p(s) divided by the probability of w(p(w)).

Formula (12) is evaluated in operation 508, that is, the probability of a query Q given word w is calculated as the product for all query terms, q of the probability p(q|w). Operation 510 evaluates formula (14) by calculating the probability of word w(p(w)) as the sum for all ad materials s in S of the probability of w given s(p(w|s)) times the probability of the ad materials s(p(s)).

Formula (11) used to select the extended query is utilized in operation 512 by calculating the probability of word w given a query Q(p(w|Q)) as proportional to the probability p(w) times the probability p(Q|w). In operation 514, the method checks whether there are more distribution words to appraise. If there are more words, operation 518 selects a new distribution word and operations 505-512 are performed for the new word. If there are no more words in operation 514, the method proceeds to operation 516, where a group of top words are selected from the distribution words according to their appraised p(w|Q). The method then continues to operation 312 as seen in FIG. 3.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to select advertisements in response to an internet query, the method comprising:
 receiving an internet query (Q), the internet query including query terms (q);
 retrieving and ranking a first set of ad materials (S) in response to the internet query using a query likelihood model, S including a plurality of ad materials (s);
 selecting sampling words using pseudo-relevance feedback and translation models, the internet query, and the first set of ad materials, wherein the sampling words are chosen from a distribution of words from the words in S, wherein the pseudo-relevance feedback model is used to select a word (w) in the distribution of words based on a probability that w generates q(p(q|w)), wherein the probability p(q|w) is based on a translation probability that w translates into q(t(q|w)), t(q|w) being calculated with the translation model;
 retrieving and ranking a second set of ad materials using an expanded query, the expanded query including the internet query and the selected sampling words; and
 displaying advertisements based on the second set of ad materials.

2. The method as recited in claim 1, wherein selecting sampling words further includes,
 selecting a translation table,
 retrieving t(q|w) from the translation table,
 calculating a probability for each w given the internet query Q(p(w|Q)), and
 selecting the sampling words by choosing a number of w with a highest p(w|Q).

3. The method as recited in claim 2, wherein calculating the probability p(w|Q) further includes,
 calculating the probability p(q|w) based on the translation probability t(q|w),
 calculating a probability of the internet query Q given the word w(p(Q|w)) as a product for all q of all the probabilities p(q|w),
 calculating a probability of the word w(p(w)) as the sum for all s in S of probabilities of w given the ad materials s(p(w|s)) times a probability of the ad materials s(p(s)), and
 calculating the probability p(w|Q) as proportional to the probability p(w) times the probability p(Q|w).

4. The method as recited in claim 3, wherein calculating the probability $p(q|w)$ further includes making $p(q|w)$ equal to the probability $t(q|w)$.

5. The method as recited in claim 3,
wherein selecting sampling words further includes calculating a probability of query term q given ad materials $s(p(q|s))$ as equal to the number of times q occurs in the ad materials s divided by a number of words in the ad materials s,
wherein calculating the probability $p(q|w)$ further includes making $p(q|w)$ equal to the sum for all s of the probability $t(q|w)$ times the probability $p(q|s)$ times the probability $p(w|s)$ times the probability $p(s)$ divided by the probability $p(w)$.

6. The method as recited in claim 3, wherein the translation table includes,
a plurality of rows corresponding to translation words,
a plurality of columns corresponding to words to be translated, and
table cells that indicate a probability that the translation word in the row of the table cell is the translation for the word to be translated in the column of the table cell.

7. The method as recited in claim 1, wherein the second set of ad materials is selected from a group consisting of,
a content match ad for the internet query, and
a sponsored search ad for the internet query.

8. The method as recited in claim 1, wherein displaying advertisements further includes showing a plurality of advertisements in an internet browser.

9. A non-transitory computer readable medium having program instructions for selecting advertisements in response to an internet query, comprising:
program instructions for receiving an internet query (Q), the internet query including query terms (q);
program instructions for retrieving and ranking a first set of ad materials (S) in response to the internet query using a query likelihood model, S including a plurality of ad materials (s);
program instructions for selecting sampling words using pseudo-relevance feedback and translation models, the internet query, and the first set of ad materials, wherein the sampling words are chosen from a distribution of words from the words in S, wherein the pseudo-relevance feedback model is used to select a word (w) in the distribution of words based on a probability that w generates $q(p(q|w))$, wherein the probability $p(q|w)$ is based on a translation probability that w translates into $q(t(q|w))$, $t(q|w)$ being calculated with the translation model;
program instructions for retrieving and ranking a second set of ad materials using an expanded query, the expanded query including the internet query and the selected sampling words; and
program instructions for displaying advertisements based on the second set of ad materials.

10. The non-transitory computer readable medium having program instructions as recited in claim 9, wherein the program instructions for selecting sampling words further includes,
program instructions for selecting a translation table, program instructions for retrieving $t(q|w)$ from the translation table,
program instructions for calculating a probability for each w given the internet query O $(p(w|O))$, and
program instructions for selecting the sampling words by choosing a number of w with a highest $p(w|Q)$.

11. The non-transitory computer readable medium having program instructions as recited in claim 10, wherein the program instructions for calculating the probability $p(w|Q)$ further includes,
program instructions for calculating the probability $p(q|w)$ based on the translation probability $t(q|w)$,
program instructions for calculating a probability of the internet query Q given the word $w(p(Q|w))$ as a product for all q of all the probabilities $p(q|w)$,\ program instructions for calculating a probability of the word $w(p(w))$ as the sum for all s in S of probabilities of w given the ad materials $s(p(w|s))$ times a probability of the ad materials $s(p(s))$, and
program instructions for calculating the probability $p(w|Q)$ as proportional to the probability $p(w)$ times the probability $p(Q|w)$.

12. The non-transitory computer readable medium having program instructions as recited in claim 11, wherein the program instructions for calculating the probability $p(q|w)$ further includes program instructions for making $p(q|w)$ equal to the probability $t(q|w)$.

13. The non-transitory computer readable medium having program instructions as recited in claim 11,
wherein the program instructions for selecting sampling words further includes program instructions for calculating a probability of query term q given ad materials $s(p(q|s))$ as equal to the number of times q occurs in the ad materials s divided by a number of words in the ad materials s,
wherein the program instructions for calculating the probability $p(q|w)$ further includes program instructions for making $p(q|w)$ equal to the sum for all s of the probability $t(q|w)$ times the probability $p(q|s)$ times the probability $p(w|s)$ times the probability $p(s)$ divided by the probability $p(w)$.

14. The non-transitory computer readable medium having program instructions as recited in claim 9, wherein the program instructions for displaying advertisements further includes program instructions for showing a plurality of advertisements in an internet browser.

15. A system for selecting advertisements in response to an internet query, comprising:
a search server that receives an internet query (Q), the internet query including query terms (q), wherein the search server includes a microprocessor;
an ad server that retrieves and ranks a first set of ad materials (S) in response to the internet query using a query likelihood model, S including a plurality of ad materials (s);
a translation server that receives the first set of ad materials and selects sampling words using pseudo-relevance feedback and translation models, the internet query, and the first set of ad materials, wherein the translation model is used to calculate a translation probability that w translates into $q(t(q|w))$, the probability $t(q|w)$ being used by the pseudo-relevance feedback model,
wherein the ad server retrieves and ranks a second set of ad materials using an expanded query, the expanded query including the internet query and the selected sampling words; and
a display of the user for receiving advertisements based on the second set of ad materials.

16. The system as recited in claim 15, wherein selecting sampling words further includes,
selecting a translation table,
retrieving $t(q|w)$ from the translation table, calculating a probability for each w given the internet query $Q(p(w|Q))$, and selecting the sampling words by choosing a number of w with a highest $p(w|Q)$.

17. The system as recited in claim 16, wherein calculating the probability $p(w|Q)$ further includes, calculating a probability that w generates $q(p(q|w))$ based on the translation probability $t(q|w)$, calculating a probability of the internet query Q given the word $w(p(Q|w))$ as a product for all q of all the probabilities $p(q|w)$, calculating a probability of the word $w(p(w))$ as the sum for all s in S of probabilities of w given the ad materials $s(p(w|s))$ times a probability of the ad materials $s(p(s))$, and calculating the probability $p(w|Q)$ as proportional to the probability $p(w)$ times the probability $p(Q|w)$.

18. The system as recited in claim 17, wherein calculating the probability $p(q|w)$ further includes making $p(q|w)$ equal to the probability $t(q|w)$.

19. The system as recited in claim 17, wherein selecting sampling words further includes calculating a probability of query term q given ad materials $s(p(q|s))$ as equal to the number of times q occurs in the ad materials s divided by a number of words in the ad materials s, wherein calculating the probability $p(q|w)$ further includes making $p(q|w)$ equal to the sum for all s of the probability $t(q|w)$ times the probability $p(q|s)$ times the probability $p(w|s)$ times the probability $p(s)$ divided by the probability $p(w)$.

20. The system as recited in claim 15, wherein the second set of ad materials is selected from a group consisting of, a content match ad for the internet query, and a sponsored search ad for the internet query.

\* \* \* \* \*